United States Patent [19]
Rueb et al.

[11] Patent Number: 5,957,559
[45] Date of Patent: Sep. 28, 1999

[54] LASER SCANNED MENU

[75] Inventors: Kurt D. Rueb, Kitchener; Edward S. Bianchin, Waterloo, both of Canada

[73] Assignee: Virtek Vision Corporation, Waterloo, Ontario, Canada

[21] Appl. No.: 08/848,685

[22] Filed: Apr. 29, 1997

[51] Int. Cl.[6] .................................................. G03B 21/14
[52] U.S. Cl. ........................... 353/28; 345/113; 345/902; 353/122
[58] Field of Search ................ 353/122, 28; 364/468.01, 364/468.21, 468.25, 514 A, 512; 345/113, 146, 158, 902

[56] References Cited

U.S. PATENT DOCUMENTS

| | | |
|---|---|---|
| 5,381,258 | 1/1995 | Bordignon et al. ..................... 359/202 |
| 5,430,662 | 7/1995 | Ahonen ...................................... 353/28 |
| 5,450,147 | 9/1995 | Dorsey-Palmateer ..................... 353/28 |
| 5,506,640 | 4/1996 | Orlich ....................................... 353/28 |
| 5,588,216 | 12/1996 | Rank et al. ............................... 353/28 |
| 5,646,859 | 7/1997 | Petta et al. .......................... 364/468.01 |
| 5,651,600 | 7/1997 | Dorsey-Palmateer ..................... 353/28 |
| 5,757,647 | 5/1998 | DeMichele .......................... 364/468.01 |

*Primary Examiner*—William Dowling
*Attorney, Agent, or Firm*—Howard & Howard

[57] ABSTRACT

An improved method and apparatus for controlling a laser projection assisted assembly operation includes the ability to display a menu with the laser projector. An operator is able to request the menu be displayed at the operator's location. The menu provides the operator the ability to select from several display options. By selecting an icon associated with a desired display option, the operator is able to change the display option at a location remote from the control. This is particularly valuable in large laser assisted work assemblies.

7 Claims, 2 Drawing Sheets

LASER SCANNED MENU

BACKGROUND OF THE INVENTION

This invention relates to an improved method for selecting scanning options from a laser scanning system.

Laser scanning systems are utilized for many industrial applications. Laser scanners are now being utilized to replace templates for positioning work pieces to be assembled into a composite unit. As an example, laser scanners are utilized to position plies on large vehicle bodies such as airline fuselages. Laser scanners are also utilized to assist in the positioning of roof truss components.

In such laser scanning applications, a laser scanning beam typically scans an outline of the desired location for the workpiece. An assembler may then properly position the workpiece without the requirement of time consuming template positioning or measuring. Many different scanning options may be utilized. As an example, when assembling a truss, the assembler may wish to have the laser only provide an outline of the positioning of the wooden truss boards, or alternatively may only want the connecting plates outlined. In some applications, the assembler may want both the boards and the plates provided in the scanned image. Other options relate to the height of the laser image above the table. The assembler may wish to have the beam aimed at the ground, while at other times it may be desired to have the beam directed to a location spaced several feet above the ground, and on the top surface of the assembled boards.

Typically, a computer menu is provided to select among the options. The assembler is thus required to travel to the computer which controls the laser scanner to select among these options. In many cases, the assembler may be working in a large assembly facility floor, which is remote from the computer. If the assembler wishes to perform work at one location of the assembly location, and wishes to switch between several display options, it is quite time consuming to have to travel back and forth to the computer to switch between the various display options.

Control of a laser scanned image has been achieved remotely in some limited applications. It is known to position a reflector in the laser scanning beam in a confined area repeatedly. The beam is then reflected back to the laser scanner system. The reflected beam is taken as a signal to focus the beam on only the location adjacent to the area where the operator has requested the focus. However, there have been no known systems developed which allow the operator to select between several available scanning options at a location remote from the computer.

SUMMARY OF THE INVENTION

In a disclosed embodiment of this invention, a control for a laser reads a reflected beam as a request to display a menu with the scanning system. The control is operable to then drive the laser projector to project an image of icons associated with available laser scanning display options at a location adjacent to the location where the request was made. The operator can then reflect a portion of the beam that makes up one of the icons. The control is capable of sensing which icon is selected by identifying the location of the second reflected beam. The control is operable to change the display option provided by the laser scanning system on the workplace surface in view of the selected icon. The operator may also advance the display to the next part to be assembled.

By utilizing the present invention, an operator is able to change display options from a location remote from the computer, and adjacent to the area where the work is being performed. Thus, an operator who is performing work on a large workpiece such as a truss is able to repeatedly change the laser display options without leaving the work area and travelling to the computer. This is a significant improvement over the prior art.

These and other features of the present invention can be best understood from the following specification and drawings, of which the following is a brief description.

DETAILED DESCRIPTION OF A PREFERRED EMBODIMENT

Figure 1:
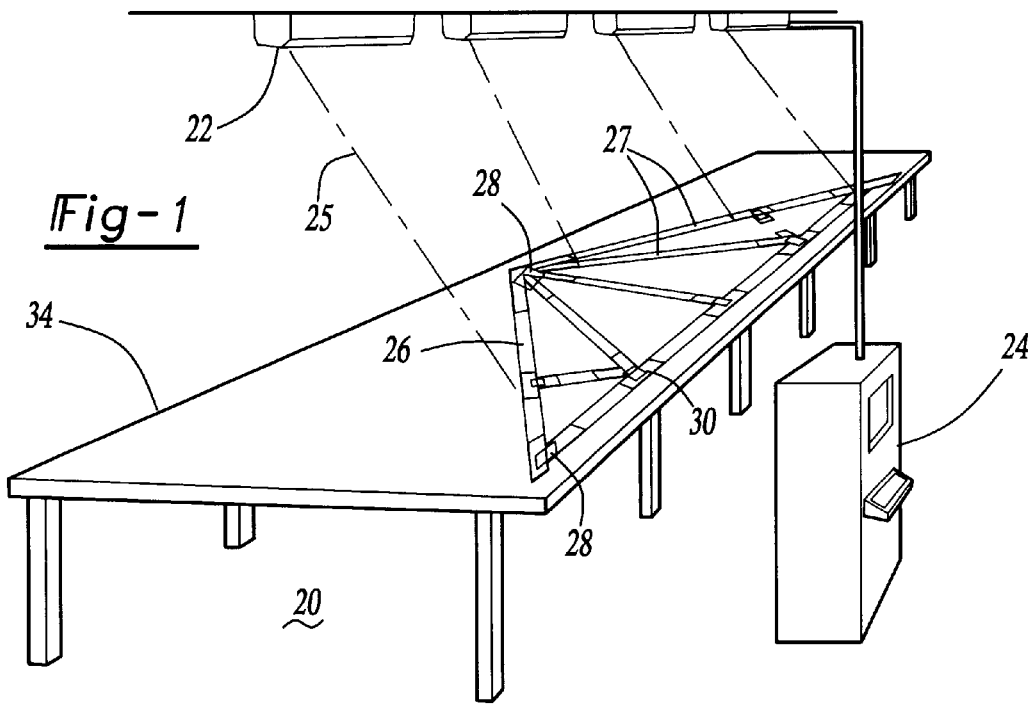
FIG. 1 schematically shows a work space for a large laser assisted assembly operation.

FIG. 1 shows a laser assisted assembly operation 20 including a laser projector system 22, shown schematically. A control 24 includes a computer, as known, which is operable to drive the laser projector system 22 and achieve a desired scanned image. A laser beam 25 is shown displaying the outline of a truss 26. It should be understood, that actual truss outlines may be somewhat more complex than outline 26. For purposes of understanding this application, outline 26 is shown very simplified.

Truss outline 26 consists of a plurality of boards 27 and three connection plates 28, 29 and 30. It should be understood that the three plates are only an example, and more or less plates may be used in same applications. An operator will align real boards and plates with these outlines on a fabrication table 34.

The computer 24 is operable to change the outline to be displayed by the laser projector system 22, as explained above. A known computer is provided with a menu which allows an operator to select any one of several available display options. An operator may wish to change the display option shown at any moment to assist in the immediate needs of the assembly operation. For this reason, the laser projector is provided with the ability to display several different display options. As set forth above, this has typically required the operator to travel to the computer.

Figure 2A:
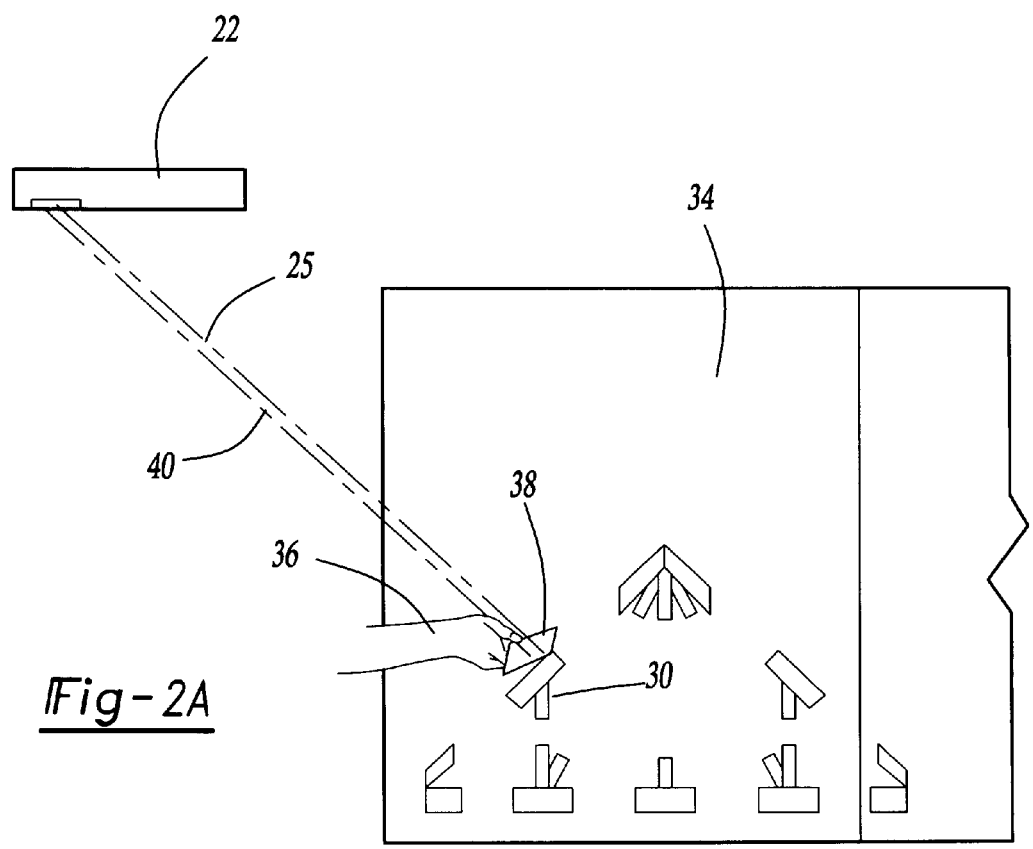
FIG. 2A shows a first step in requesting a menu to be provided by the laser projections system.

The present invention improves upon this prior art. As shown in FIG. 2A, an operator 36 places a retro-reflector 38 into the path of the beam 25. Here the operator 36 is shown working at joint 30.

When reflector 38 is placed in the path of the beam 25, a reflected beam 40 travels back to the laser projector system 22. Laser projector system 22 is shown very schematically, and contains several features such as are typically provided with the laser projector system. In particular, the laser projector system is provided with a laser generator, a galvanometer, and at least a sensor for sensing reflected beam 40. The sensor captures the reflected beam 40, and sends a signal to the control 24 that the operator has requested a menu display.

If the control is also capable of providing a focus function, such as is described in the Background of the Invention section of this Application, then some way of distinguishing between the request for a menu and a request for focus must be provided in the software. Providing such a distinction is well within the ability of a worker in the art.

Figure 2B:
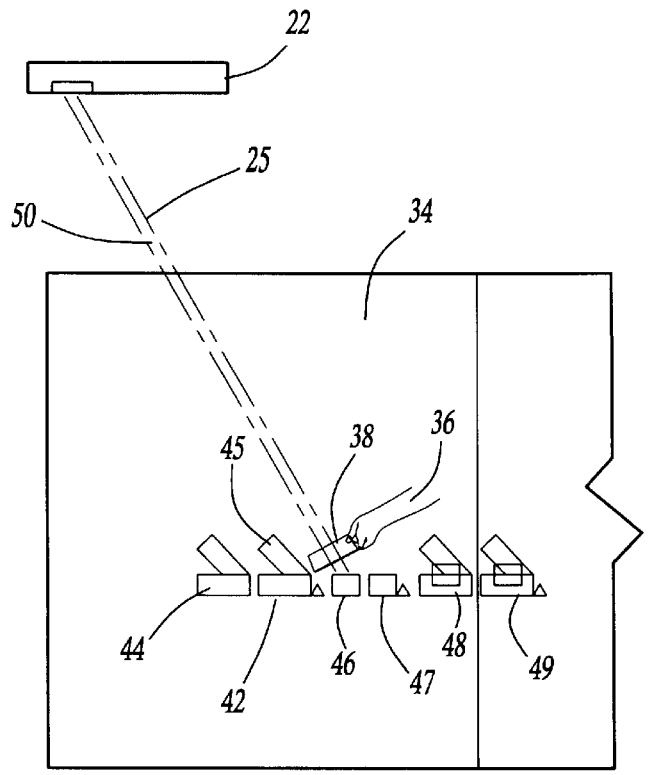
FIG. 2B shows a second step.

As shown in FIG. 2B, the control 24 has now reacted to the request signal for a menu by driving the projector 22 to modify the path of beam 25, and display a menu 42 on table 34. It should be understood, that the menu can be displayed in any area on the workspace, and is most preferably displayed at the area where the operator 36 has initially requested the menu by sending signal 40. This will ensure that the menu 42 is provided adjacent to where the operator is performing the work.

As shown in FIG. 2B, menu 42 consists of several icons 44, 45, 46, 47, 48 and 49. Icons 44–49 are provided by the scanned laser beam 25. These icons provide the operator with the ability to select from several display options. Icon 46 may correspond to a request for only displaying the connecting plates. Icon 47 corresponds to a request for displaying the connection plates at an "up" location, or on top of board level. Icon 44 requests displaying only the boards. Icon 45 requests displaying boards at the "up" location. Icon 48 requests displaying both boards and connecting plates on the table surface, and icon 49 requests displaying both boards and plates at an "up" location. It should be understood when the term "icon" as utilized in this Application may refer to graphic symbols such as are shown in FIG. 2B. However, for purposes of this Application, the term "icon" can also refer to text, or any other type indicia. What is important is that the operator is provided with a variety of options by the laser scanner 22 at a location adjacent to where the operator is performing the work.

As shown in FIG. 2B, the operator 36 has placed the retro-reflector 38 at the laser beam and in the location of icon 46. A reflected beam 50 is returned to the laser projector 22 and to its sensor. Laser projector 22 communicates with control 24 to provide the signal. Control 24 then drives the laser projector 22 to display the display option associated with icon 46.

Figure 2C:
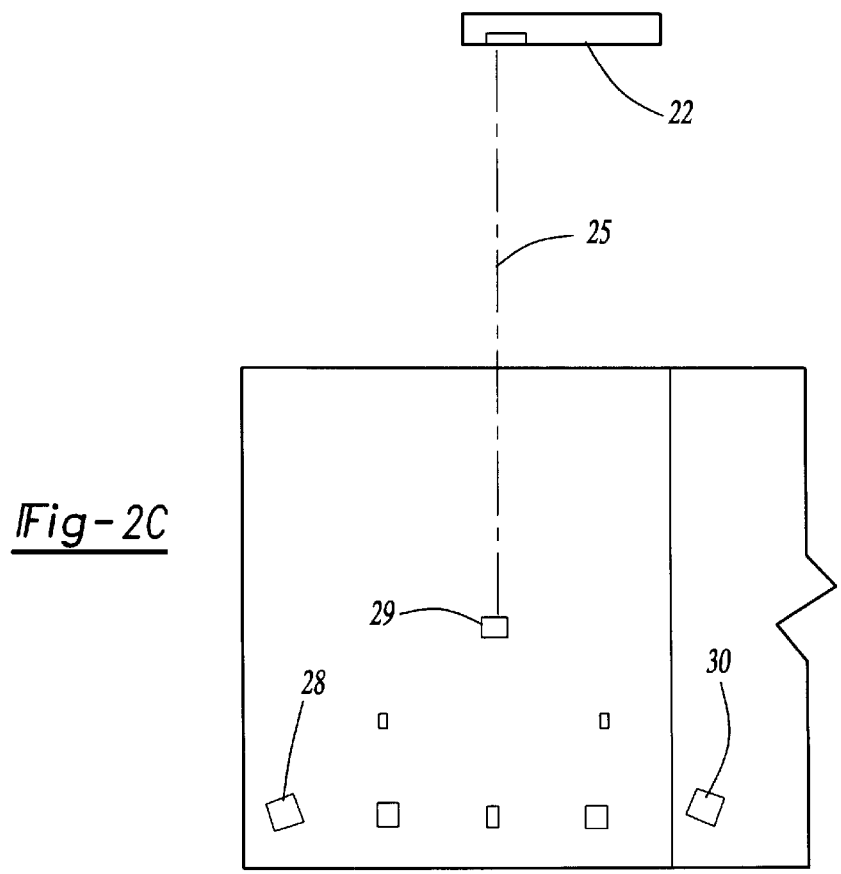
FIG. 2C shows the final step.

As shown in FIG. 2C, the laser projector 22 now drives the beam 25 to only display the connecting plates 28, 29 and 30, etc. as shown in FIG. 2C. This is the display option associated with icon 46. When the operator completes the work that required this option, the operator may again place the retro-reflector 38 in the path of the beam 24 to request the menu 42, and may then change the display option.

A preferred embodiments of this invention has been disclosed, however, a worker of ordinary skill in the art would recognize that certain modifications come within the scope of this invention. For that reason, the following claims should be studied to determine the true scope and content of this invention.

We claim:

1. A laser projection system comprising:

a laser projector;

a control for driving said laser projector, said control being operable to drive said laser projector and control the path of a laser beam to achieve a desired image, said control storing a plurality of display options for said laser projector, said control being operable to receive a request signal requesting that a menu be displayed at a location remote from said control, and said control being operable to drive said laser projector to scan the image of a plurality of icons corresponding to said plurality of display options at a location remote from said control upon receiving said request signal.

2. A laser projection system as recited in claim 1, wherein said laser projector includes a reflection sensor which receives a reflected beam from a laser beam sent by said laser projector, and said request signal being provided by said sensor receiving a reflected beam.

3. A laser projection system as recited in claim 1, wherein said display option include a plurality of display options for the assembly of trusses.

4. A laser projection system as recited in claim 1, wherein said icons graphically represent said display options.

5. A method of displaying the image of workpieces to be assembled comprising the steps of:

(1) providing a laser projector and providing a control for said laser projector, said control being operable to drive said laser projector to achieve a desired scanned image in any one of a plurality of display options;

(2) driving said laser projector with said control to display a scanned image with a laser beam;

(3) sending a signal to said control to request a menu with icons associated with said plurality of display options at a location remote from said control;

(4) driving said laser projector with said control to display a laser projected menu at a location remote from said control;

(5) selecting one of said icons on said display menu, and sending a selection signal to said control of a selected icon; and (6) driving said laser projector to display the display option associated with said selected icon.

6. A method as recited in claim 5, wherein said request for menu and said selection signals are made by placing a retro-reflector in the path of the laser beam, and reflecting the beam back to a sensor associated with said laser projector.

7. A method as recited in claim 5, wherein said icons are graphic representations.

* * * * *